United States Patent [19]
Breysse et al.

[11] 3,979,298
[45] Sept. 7, 1976

[54] FLUID SEPARATING APPARATUS

[75] Inventors: Jacques Breysse, Villeurbanne; Jean Roget, Lyon, both of France

[73] Assignee: Rhone-Poulenc S.A., Paris, France

[22] Filed: May 28, 1974

[21] Appl. No.: 473,677

Related U.S. Application Data

[63] Continuation-in-part of Ser. No. 326,853, Jan. 26, 1973, abandoned.

[30] Foreign Application Priority Data

Jan. 28, 1972 France .............................. 73.02900

[52] U.S. Cl. .............................. 210/232; 210/321 R
[51] Int. Cl.² ......................................... B01D 31/00
[58] Field of Search ........... 210/321, 232, 486, 417, 210/343, 433, 346

[56] References Cited
UNITED STATES PATENTS

| | | | |
|---|---|---|---|
| 3,263,819 | 8/1966 | Schmidt et al. .................... | 210/486 |
| 3,491,886 | 1/1970 | Gloss et al. ...................... | 210/486 X |
| 3,701,431 | 10/1972 | Brown et al. ...................... | 210/321 |
| 3,809,246 | 5/1974 | Hiogret ............................ | 210/433 X |

*Primary Examiner*—Frank A. Spear, Jr.
*Attorney, Agent, or Firm*—Cushman, Darby & Cushman

[57] ABSTRACT

Fluid separating apparatus in which a stack of membrane support plates are clamped between two end plates, each membrane support plate including two elementary plates of generally rectangular configuration and substantially constant wall thickness, said elementary plates being assembled in back-to-back relationship. The elementary plates are joined in fluidtight manner to one another, at least one orifice extending through each elementary plate in the vicinity of at least one end thereof for the passage of fluid to be treated, a first recess being provided on the front face of at least one of the two elementary plates, said recess forming a cell. A chamber is located between the back faces of the elementary plates and perforations through at least one elementary plate provide communication between each cell and the associated chamber and duct forming means provide communication between the chamber and the edge of the support plate. A membrane support and a membrane are located in each cell, with the membrane outermost, and a gasket is located between adjacent membranes of adjacent support plates.

10 Claims, 7 Drawing Figures

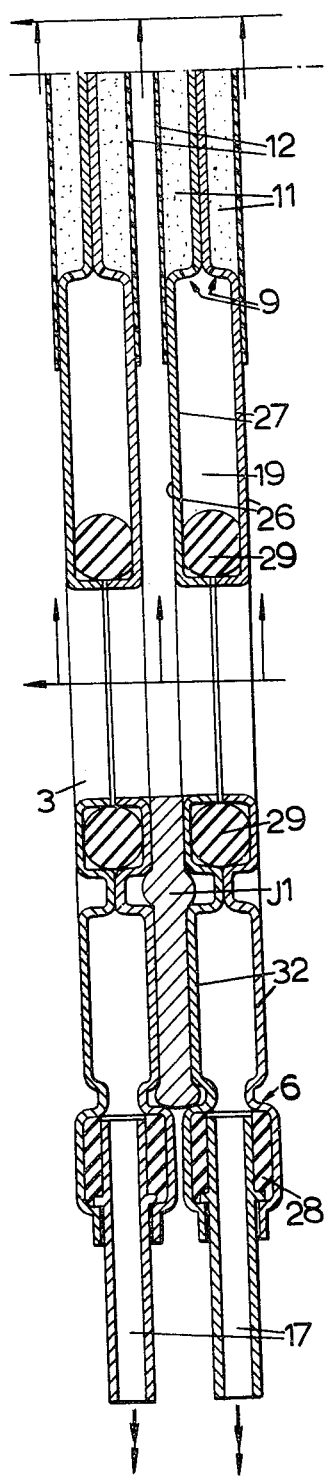
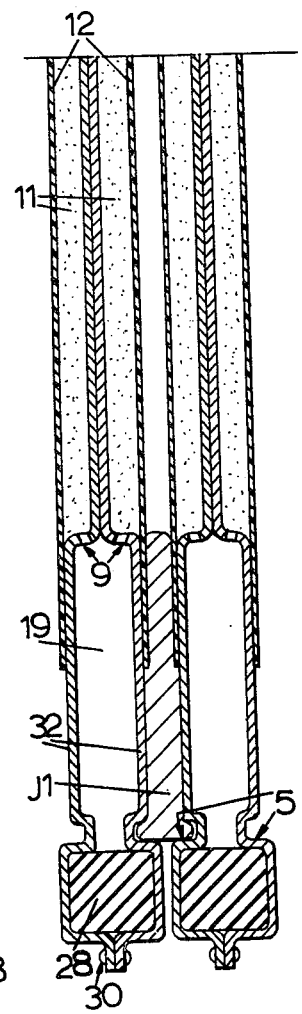
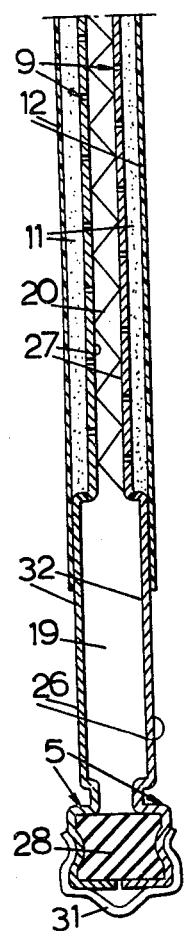

FLUID SEPARATING APPARATUS

CROSS REFERENCE TO RELATED APPLICATIONS

This application is a continuation-in-part application of our copending application Ser. No. 326,853, filed Jan. 26, 1973, now abandoned.

The present invention relates to fluid separating apparatus.

In British Patent No. 1,381,681, there is disclosed an apparatus for separating fluids by selective permeability, in which the fluid to be treated flows in contact with membranes. In this apparatus between two end-plates is located an alternating stack of gaskets which define the thickness of the sheet of fluid flowing, and membrane support-plates. Each of the said membrane support-plates comprises two elementary plates of generally rectangular configuration, the elementary plates being assembled in a fluidtight manner in back-to-back relationship, a cell forming recess provided in the front face of each elementary plate to receive a membrane support and membrane, with the membrane outermost, an enclosure formed between the back faces of the elementary plates, perforations through the elementary plates providing communication between the end cell and the enclosure, a supporting abutment or abutments in the enclosure maintaining the elementary plates apart, at least one duct providing communication between the enclosure and the edge of the plate and at least one orifice extending through each elementary plate in the vicinity of at least one end thereof for the passage of fluid to be treated.

In this apparatus each support-plate thus comprises two elementary plates joined to one another in a fluidtight manner via their inside faces, the flat parts of which are in contact and are glued to one another, whilst the hollow parts define the internal chamber and the internal tube of the support-plate. This type of support-plate necessitates having elementary plates with zones of excess thickness at certain places and these elementary plates, which cannot be produced by injection moulding so as to have dimensions of 200 cm length and 0.5 to 1 cm thickness, can be produced by heat-shaping. However, this method of production has not proved very economical because of the time intervals necessary for heating and cooling such elementary plates, under pressure.

According to the present invention, we provide fluid separating apparatus comprising, two end plates, a stack of membrane support plates clamped between said end plates, each membrane support plate including two elementary plates of generally rectangular configuration and substantially constant wall thickness, said elementary plates being assembled in back-to-back relationship, means joining said elementary plates in fluidtight manner to one another, at least one orifice extending through each elementary plate in the vicinity of at least one end thereof for the passage of fluid to be treated, a first recess on the front face of at least one of said two elementary plates, said recess forming a cell, a chamber between the back faces of the elementary plates, perforations through at least one elementary plate to provide communication between each cell and the associated chamber and duct forming means providing communication between the chamber and the edge of the support plate, a membrane support and a membrane being located in each cell, with the membrane outermost; and a gasket being located between adjacent membranes of adjacent support plates.

Which such a separating apparatus, each support-plate can be of large dimensions (for example length 200 cm and thickness from 0.5 to 1 cm), whilst being suitable for high manufacturing rates. Moreover, the elementary plates are no longer joined in a fluidtight manner via their inside faces which are in contact and can be made readily from materials possessing high mechanical strength, great rigidity, high heat-resistance and good resistance to deterioration.

In order that the present invention will be better understood, the following description is given, merely by way of example, reference being made to the accompanying drawings, in which:

FIG. 2 is a cross-sectional view taken along the line II—II of FIG. 1;

FIG. 3 is a cross-sectional view taken along the line III—III of FIG. 1;

FIG. 4 is a cross-sectional view of a modified construction of a support-plate;

The support-plate for one or more membranes of an apparatus according to the present invention results from the joining together, in a fluidtight manner, of two elementary plates, for example, stamped-out metal plates, having a substantially constant wall thickness. Such a support-plate, the general shape of which is rectangular, is substantially symmetrical relative to the longitudinal median plane perpendicular to its main faces and generally possesses positioning notches (not shown) corresponding to guide bars or sections. An apparatus comprising such support-plates, preferably has bars in the horizontal position on which the plates are suspended vertically.

Figure 1:
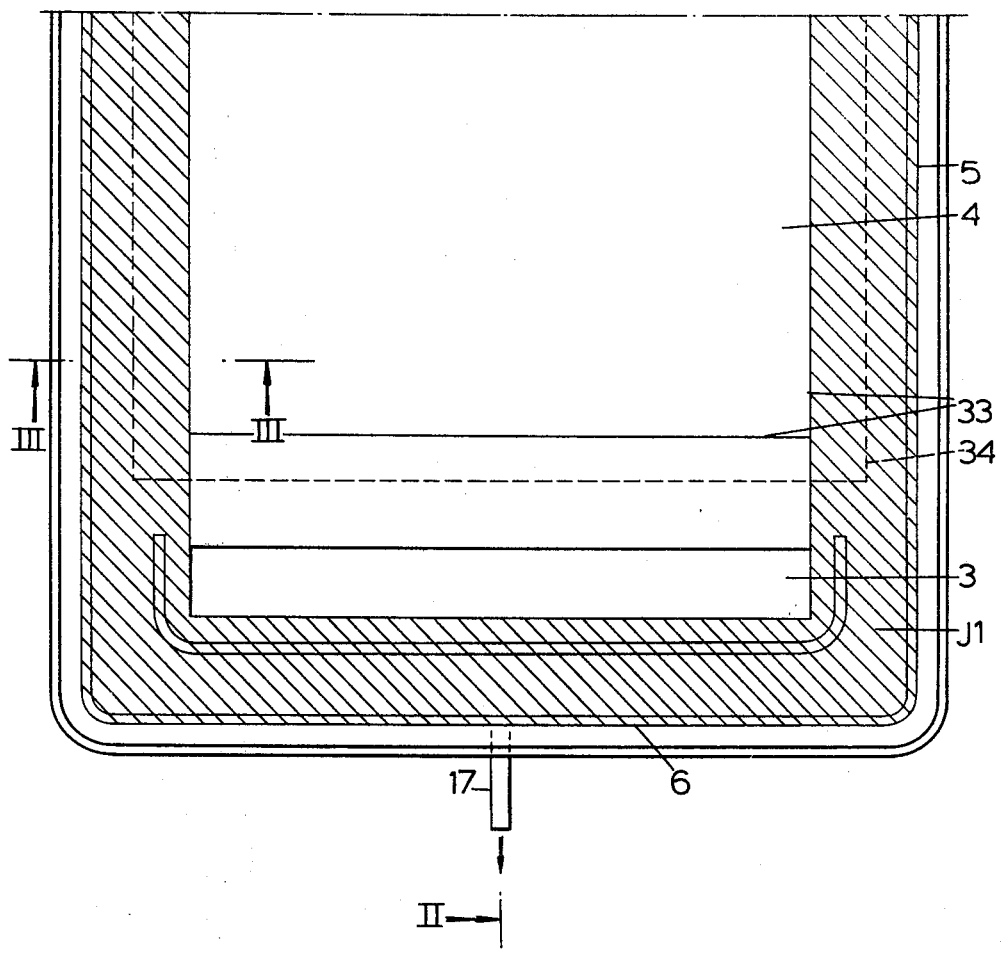
FIG. 1 is a partial view in elevation of one embodiment of the support-plate of an apparatus according to the present invention.

The support-plate of an apparatus according to the present invention can have two identical elementary plates, each of which has one cell and one preferably elongated orifice, through which the fluid to be treated passes, at each of its ends; such an embodiment is represented in FIGS. 1 to 3.

The support-plate can optionally have an orifice, through which the fluid to be treated passes, only at one of its ends. The support-plate can, moreover, comprise two different elementary plates, only one of which, for example, has a cell with a membrane, whilst the support-plate has an orifice through which the fluid to be treated passes, at each end or at only one end. The support-plate of an apparatus according to the present invention can optionally comprise two or more cells on one or on both of the elementary plates.

A support is placed in each cell, and the support is covered with the membrane to be used, which is suitable for the type of separation envisaged.

FIG. 1 represents more precisely the lower part of a support-plate in the vertical position in an apparatus, which explains the presence of an opening 17 for recovering the permeate. This support-plate is substantially symmetrical relative to a longitudinal median plane passing through the cross-sectional line II—II, and the upper part (not shown) of the support-plate is substantially identical to the lower part, with the difference that it does not have an opening 17 and that its upper part can have positioning or holding notches which, in the assembled apparatus, rest on bars.

The support-plate shown in FIGS. 1 to 3 comprises two identical elementary stamped-out metal plates 32 each of which has, at each end, an orifice 3 through which the fluid to be treated passes and a cell forming recess 4 between these two orifices. Each orifice 3 through which the fluid to be treated passes is preferably elongated and its dimension transverse to the longitudinal axis of the plate corresponds substantially to the width of the cell. A support 11, for example made of a non-woven porous material such as polyethylene glycol terphthalate, is placed in each cell 4, and a membrane 12 rests on this support.

Advantageously the support 11 fills the cell 4 completely and comes substantially to the level of the outer face 26 of the elementary plate 32. In the method of assembling represented, each membrane 12 covers the inner edges 33 of the cells 4. The membrane 12 is held longitudinally in a leakproof manner by a gasket J1, during the clamping of the apparatus, whilst transversely the membrane is held at each of its ends, for example by gluing to the plate. The broken line 34 shows the position of the edge of a membrane on the support-plate of FIG. 1, whilst the cross-hatching defines the position and the shape of the frame-gasket J1 placed between two support-plates.

In each support-plate represented in FIG. 2, the two elementary plates 32 are in contact via their inner faces 27 with the back of the cells, perforations 9 ensuring the discharge of the permeate via the inner edges 33 of the cell.

In order to achieve fluidtight sealing between the two elementary plates 32, a peripheral gasket 28 is placed between them and a gasket 29 is placed around each elongated orifice. A nozzle 17 passes through the peripheral gasket 28 for the easier recovery of the permeate. The two elementary plates are held together by fixing means such as, for example, rivets 30 or clips 31, provided at intervals on the periphery of the support-plate. The two elementary plates 32 can optionally be crimped.

Each elementary plate advantageously comprises, on its outer face 26, longitudinal and transverse rims 5 and 6 for positioning and holding the frame-gasket J1 situated between two support-plates.

Figure 5:
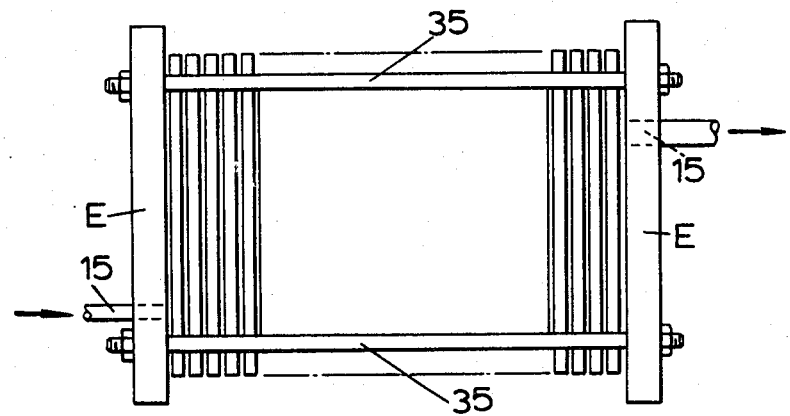
FIG. 5 is a side elevation of one embodiment of apparatus according to the invention.

The outer appearance of an apparatus comprising support-plates according to the present invention alternating with gaskets J1 is represented in FIG. 5. These support-plates are clamped by means of threaded rods 35 between two end-plates E, each of which has an opening 15 through which the fluid to be treated passes, one opening being for introducing the fluid and the other for discharging the fluid. When the support-plates have an opening at each end the fluid to be treated flows in parallel between the support-plates, as is better represented in FIG. 2, whilst the permeate, after having passed through the membrane and porous support and then flowed through the inner chamber 19 of each support-plate, is collected via the openings 17. When the support-plates of an apparatus according to the present invention have an opening at only one of their ends, the support-plates are arranged alternately with the opening at the bottom and then at the top so that the fluid to be treated flows in series from one support-plate to another. This latter arrangement is called head-to-tail.

Figure 6:
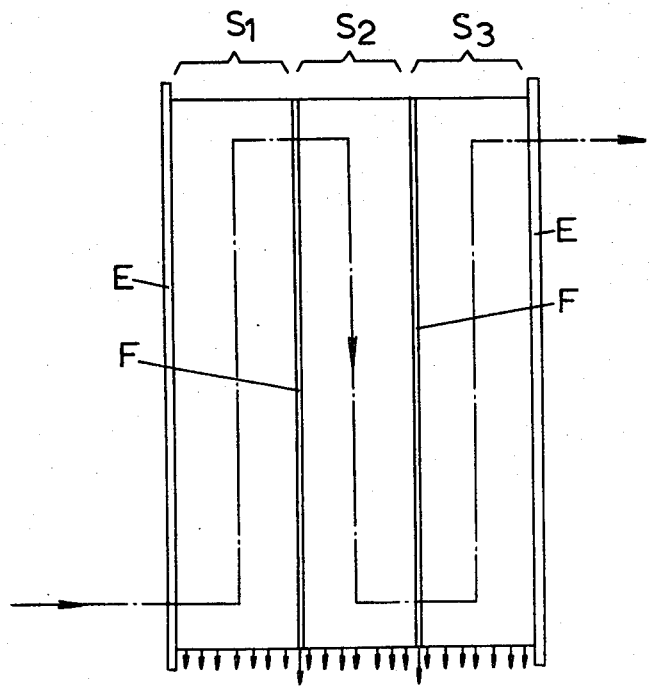
FIG. 6 is a diagrammatic view of the way in which the fluids flow inside such an apparatus.

A particularly valuable arrangement of an apparatus according to the invention consists of grouping together a certain number of support-plates with an opening at each end, so that they form sub-combinations, for example S1, S2 and S3, each sub-combination consisting of the said support-plates alternating with gaskets J1. These sub-combinations, which may or may not consist of the same number of support-plates alternating with gaskets J1, are separated from one another by a support-plate F which has an orifice 3 through which the fluid to be treated passes only at one of its ends. The fluid to be treated thus flows in parallel between each support-plate of a sub-combination, whilst it flows in series from one sub-combination to the other, as is represented diagrammatically in FIG. 6 for an apparatus comprising three sub-combinations, each of which possesses seven support-plates, the permeate outlets of which are symbolised by the small arrows at the foot of the apparatus.

A support-plate according to the present invention can be the subject of numerous different embodiments. Thus a support-plate may not contain gaskets 28 and 29 between the two elementary plates 32 if the latter are connected to one another in a fluidtight manner. A method for producing such a support-plate can consist of enamelling together two elementary stamped-out metal plates 32, after having fixed them firmly to one another by any known means, for example by means of welds, the enamel then filling up the interstices between the two plates on their periphery and opposite each elongated orifice 3.

Another embodiment can consist of welding the two elementary plates 32 directly to one another in a fluidtight manner, at their periphery and opposite the openings 3 through which the fluid to be treated passes, the welding being effected, for example, by means of a roller electrode.

A support-plate of an apparatus according to the present invention can optionally have one or more resting stops, for example a grid 20, between the two elementary plates 32, as is represented in FIG. 4. In this case, perforations 9 can be provided at the bottom of each cell 4, the strengthening grid 20 allowing the permeate to flow over the inner face 27 at the back of the cells 4.

A rigid foam may optionally be placed between the two elementary plates to achieve better rigidity of the support plate.

A support-plate may optionally comprise a membrane support 11, firmly fixed to the cell 4, of each elementary plate 32, especially when a screen-reinforced membrane is used, this support having, for example, protuberances which are sufficiently numerous and of suitable size so that their upper part supports the membrane whilst they leave between them sufficient space to allow the permeate to flow. These protuberances can be produced by stamping, at the same time as each elementary plate 32 is stamped out.

When the cells 4 of the elementary plates have a detachable support 11, for example made of paper treated with phenol/formaldehyde resin, the membrane need not project beyond the cell and the ends of the said membrane are advantageously folded back under the porous support 11 and glued transversely at the bottom of the cell, the gasket J1 then projecting beyond the cell to achieve lateral fluidtight sealing of the membrane.

Figure 7:
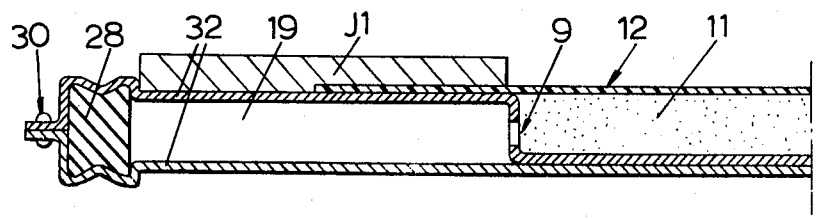
FIG. 7 is a cross-sectional view of another embodiment of the support-plate of apparatus according to the invention.

A different embodiment of this support-plate of an apparatus according to the present invention, which has one cell with a porous support 11 and one membrane 12 only on one of its two elementary plates, is represented in FIG. 7.

The support-plates of an apparatus according to the present invention can be made from any sheet stock metals or alloys which are usually employed in industry and which can be stamped out, such as stainless steel, titanium and the like, or from metal which has been surface-treated, for example by enamelling. They can also be made from plastics, for example heat-resistant resins, these plastics being advantageously reinforced, for example by glass fibre.

The support-plates of an apparatus according to the present invention can be of great length (1.5 to 2 metres), whilst having a low thickness (generally 5 to 10 mm). Moreover, because of the low wall thickness of the elementary plates (generally 0.5 to 2 mm), the support-plates produced are not very heavy and can thus be handled easily despite their large dimensions.

We claim:

1. Fluid separating apparatus comprising, in combination:
   a. two end plates;
   b. a stack of membrane support plates clamped between said end plates, each membrane support plate comprising:
      i. two elementary plates of generally rectangular configuration and substantially constant wall thickness;
      iii. front and back faces on said elementary plates, said elementary plates being assembled in back-to-back relationship;
      iii. means joining such elementary plates in fluidtight manner to one another;
      iv. at least one orifice extending through each elementary plate in the vicinity of at least one end thereof for the passage of fluid to be treated;
      v. first recess defining means on said front face of at least one of said two elementary plates, said recess defining means forming a cell;
      vi. means defining a chamber between said back faces of said elementary plates;
      vii. means defining perforations through said at least one elementary plate to provide communication between each cell and the associated chamber; and
      viii. duct forming means providing communication between the chamber and the edge of the support plate;
   c. a membrane support and a membrane located in each cell, with the membrane outermost; and
   d. a gasket located between adjacent membranes of adjacent support plates.

2. Apparatus as claimed in claim 1, wherein each support-plate has at least one orifice in the vicinity of each of its ends and said cell forming recess is situated between orifices.

3. Apparatus as claimed in claim 1, and further comprising a peripheral gasket and a gasket positioned around each orifice through which the fluid to be treated passes, said gaskets being seated inside the support-plate.

4. Apparatus as claimed in claim 1, wherein said joining means comprise fixing means external to the support-plate and positioned at its periphery.

5. Apparatus as claimed in claim 4, wherein said fixing means comprise clips.

6. Apparatus as claimed in claim 1, wherein the elementary plates are in contact inside the chamber via their inner faces with the back of said at least one cell, the perforations which bring the said chamber into communication with each cell being located on at least one of the inner edges of each cell.

7. Apparatus as claimed in claim 1, wherein the elementary plates are stamped out from sheet stock.

8. Apparatus as claimed in claim 7, wherein the elementary plates are stamped out from sheet metal stock.

9. Apparatus as claimed in claim 1 wherein the elementary plates are made of reinforced plastics material.

10. Apparatus as claimed in claim 1, and further comprising on each elementary plate peripheral rims for positioning and holding the gasket provided between two adjacent support-plates.

* * * * *

UNITED STATES PATENT OFFICE
CERTIFICATE OF CORRECTION

Patent No. 3,979,298     Dated September 7, 1976

Inventor(s) Jacques Breysse and Jean Roget

It is certified that error appears in the above-identified patent and that said Letters Patent are hereby corrected as shown below:

Foreign Application Priority Data should read

-- January 28, 1972     France     72,02900

May 29, 1973     France     73,19534--

Signed and Sealed this

First Day of November 1977

[SEAL]

Attest:

RUTH C. MASON     LUTRELLE F. PARKER
*Attesting Officer*     *Acting Commissioner of Patents and Trademarks*